Patented Jan. 12, 1943

2,308,305

UNITED STATES PATENT OFFICE 2,308,305

LAMINATED STRUCTURE AND METHOD OF MAKING THE SAME

Morris W. Reynolds, Port Huron, Mich., assignor, by mesne assignments, to Acheson Colloids Corporation, Port Huron, Mich., a corporation of Michigan No Drawing. Application November 30, 1938, Serial No. 243,275

8 Claims. (Cl. 154—2)

It is customary to manufacture a variety of articles by uniting a sheet or body of a molding composition such as a rubber composition with a sheet of cotton fabric such as canvas. For example a rubber composition in the form of a sheet of suitable thickness is laid in a mold and covered with a sheet of canvas and the two sheets are pressed together while the rubber is being heated and vulcanized, thereby firmly uniting the canvas to the body of rubber composition. In this operation the rubber composition usually is forced through the canvas in spots or unevenly, giving the product an undesirable appearance.

It has been proposed to overcome the objectionable appearance of the product by coating the fabric surface of the finished article with graphite, for instance by oiling the surface and then rubbing it with powdered graphite or by applying a suspension of colloidal graphite in oil, such treatment serving to give the fabric surface a fairly uniform black color and to lubricate it for subsequent use. But as is well known oil is harmful to natural rubber and the articles so produced are objectionable to handle because the oil and graphite tend to rub off and soil the hands and other objects with which they come in contact.

In an effort to overcome the above mentioned objections I have found that by coating the fabric with colloidal or finely divided graphite prior to the pressing operation a number of advantages are secured.

(a) The graphite seems to fill the pores of the fabric on one side and prevent the rubber composition from forcing its way entirely through the fabric during the pressing operation. Since the graphite is applied to only one side of the fabric and does not, when properly applied, appreciably penetrate through the fabric and the rubber composition is applied to the other side of the fabric, the graphite does not prevent the firm adherence of the rubber to the fabric.

(b) By this method the fabric may be coated with the graphite in bulk before it is cut into portions of the shape and size required for the molding or pressing operation. In spite of the fact that some of the coated cloth is lost in cutting, this operation is more economical, uniform and satisfactory with respect to both consumption of graphite and employment of labor than the coating of the individual finished articles.

(c) The graphite acts as a parting compound and facilitates the separation of the pressed and molded article from the pressing surface.

(d) The graphite serves to lubricate the fabric surface of the article more efficiently than the graphite applied as heretofore proposed because it has been uniformly applied. Uniform application of the graphite is not prevented as when the rubber has penetrated the fabric unevenly during the pressing operation and the graphite is subsequently applied.

(e) The application of the graphite to the fabric in the form of a suspension in water, glycerine or other non-oily liquid avoids the harmful effect of oil on the rubber portion of the article.

(f) The fabric surface of the article when made and after handling and use has a desirably uniform black color compared to the somewhat mottled appearance of the articles made by the application of graphite after the pressing operation.

(g) The articles are cleaner to handle because the graphite does not appreciably rub off of the fabric.

(h) The graphite provides an efficient and permanent lubrication of the fabric, improves its wearing qualities and prevents scorching.

In the foregoing I have referred more particularly to articles made of rubber composition and fabric. It will be appreciated that the invention is applicable in analogous relations to articles made of fabric and moldable materials other than rubber compositions, e. g., resins or resin compositions.

The invention is particularly designed for the production of rubber articles used in hydraulic devices such as washers, packings, seals and diaphragms which must be strong and durable and resistant to wear and flexing.

When making articles of rubber or rubber composition and fabric it is preferred to use the graphite in a non-oily vehicle because of the known harmful effect of oils on rubber. Thus a suspension of graphite in water or glycerine or other non-oily liquid may be employed. Under other conditions suspensions of graphite in oil may be used. It is also preferred to use the graphite in colloidal form although suspensions of finely divided graphite may be used.

Specifically I prefer to coat canvas of suitable weight and quality in the piece with an aqueous suspension of colloidal graphite such as the product of Acheson Colloids Corporation sold under the name "Aquadag," dry the canvas, cut it into portions of the desired shape and size and use them in the molding operation. A colloidal suspension of graphite of any suitable concentration, say 2%, may be applied in any suitable manner, e. g., by spraying and in any suitable quantity depending upon the roughness or porosity of the fabric and the degree of lubrication desired. I have found the application of a 4.4% suspension of colloidal graphite in water or aqueous liquid at the rate of 0.256 fluid ounces per square foot of 8 ounce canvas to give satisfactory results. Castor oil may be used as the suspending medium for the graphite. The graphite may also be applied in suspensions in volatile liquids such as gasoline, kerosene, carbon tetrachloride and the like which may be entirely or largely evaporated from the fabric before it is united with the rubber portion of the article.

It will be appreciated from the foregoing description that the essence of my invention is the coating of fabric, which is to be united to rubber or the like by a pressing operation, with graphite, prior to the pressing operation, the graphite serving not only the known function of coloring and lubricating the fabric but also as a parting agent facilitating the separation of the pressed article from the mold. Its application prior to the pressing operation prevents the penetration of the rubber composition through the fabric.

I claim:

1. Method of making composite articles which comprises applying to one surface only of a sheet of textile fabric a coating consisting of finely divided graphite and a liquid vehicle which remains fluid so long as it remains on the fabric and is harmless to rubber, contacting the other surface of the sheet of fabric with a body of moldable rubber composition and press molding the resulting structure.

2. Method of making composite articles which comprises coating one surface of a sheet of textile fabric with finely divided graphite in a liquid vehicle which is harmless to rubber, contacting the other surface of the sheet of fabric with a body of moldable rubber composition and press molding the resulting structure.

3. Method as defined in claim 2 in which the graphite is applied in suspension in a volatile liquid which is evaporated before the molding operation.

4. Method as defined in claim 2 in which the graphite is applied in the form of an aqueous suspension.

5. Method as defined in claim 2 in which the fabric is canvas and the graphite is applied by spraying the canvas with an aqueous suspension of colloidal graphite.

6. Method of forming composite articles which comprises coating a textile fabric in the piece on one side by the application thereto of an aqueous suspension of finely divided graphite, drying the fabric and cutting it into portions of the desired size and shape, laying the portions with their uncoated surfaces in contact with bodies of moldable rubber composition and press molding the resulting structures.

7. Method of making hydraulic seals which comprises spraying one surface of canvas in the piece with an aqueous suspension of colloidal graphite, cutting the canvas into portions of the desired shape and size and uniting the uncoated surface of each portion to a body of rubber composition by hot press molding.

8. A composite article comprising a body of molded rubber composition bonded directly to one surface of a single unitary relatively thin layer of a textile fabric, the other surface of said fabric being uniformly covered by a coating the sole solid constituent of which is finely divided graphite, the graphite coated surface of the fabric being free of the molded rubber composition.

MORRIS W. REYNOLDS.